(12) United States Patent
Johnson et al.

(10) Patent No.: US 8,963,695 B2
(45) Date of Patent: Feb. 24, 2015

(54) HAPTIC ALERT DEVICE HAVING A LINEAR VIBRATOR

(75) Inventors: Timothy M. Johnson, San Jose, CA (US); Yehonatan Perez, Menlo Park, CA (US); Sawyer I. Cohen, Sunnyvale, CA (US); Ashutosh Y. Shukla, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 836 days.

(21) Appl. No.: 13/118,286

(22) Filed: May 27, 2011

(65) Prior Publication Data

US 2012/0302293 A1 Nov. 29, 2012

(51) Int. Cl.
| | |
|---|---|
| *H04B 3/36* | (2006.01) |
| *B06B 1/04* | (2006.01) |
| *H04M 1/00* | (2006.01) |
| *H04M 9/00* | (2006.01) |
| *H04M 1/02* | (2006.01) |
| *H04M 19/04* | (2006.01) |

(52) U.S. Cl.
CPC .............. *B06B 1/045* (2013.01); *H04M 1/0202* (2013.01); *H04M 19/047* (2013.01)
USPC ........ 340/407.1; 455/567; 379/391; 379/392; 379/393

(58) Field of Classification Search
CPC ........................................................ H04M 1/00
USPC ..................................... 455/550.1; 340/407.1
See application file for complete search history.

(56) References Cited

U.S. PATENT DOCUMENTS

| | | | |
|---|---|---|---|
| 4,982,299 A | 1/1991 | Taniguchi et al. | |
| 5,379,032 A | 1/1995 | Foster et al. | |
| 7,224,090 B2 | 5/2007 | Oh et al. | |
| 7,471,030 B2 | 12/2008 | Bennett et al. | |
| 2006/0157632 A1 | 7/2006 | Delson | |
| 2006/0290662 A1 | 12/2006 | Houston et al. | |
| 2007/0054598 A1 | 3/2007 | Uchida et al. | |
| 2008/0248836 A1 | 10/2008 | Caine | |
| 2010/0277009 A1 | 11/2010 | Jeon | |
| 2010/0277010 A1 | 11/2010 | Jeon | |
| 2011/0018364 A1 | 1/2011 | Kim et al. | |

(Continued)

FOREIGN PATENT DOCUMENTS

| | | |
|---|---|---|
| EP | 1669238 | 6/2006 |
| EP | 1669238 B1 | 3/2009 |
| EP | 2197181 | 6/2010 |

(Continued)

OTHER PUBLICATIONS

International Preliminary Report on Patentability (Chapter I) for corresponding International Application No. PCT/US2012/037575, mailing date Dec. 12, 2013, 9 pages.
PCT International Search Report and Written Opinion (dated Apr. 10, 2013), International Application No. PCT/US2012/037575, International Filing Date—May 11, 2012, (14 pages).

(Continued)

*Primary Examiner* — Huy C Ho
(74) *Attorney, Agent, or Firm* — Blake, Sokoloff, Taylor & Zafman LLP

(57) ABSTRACT

A vibrator designed to be integrated into a portable electronic device as part of a haptic alert device has a linear electric motor that is coupled to actively drive a moveable weight in back-and-forth directions to produce the desired vibration. A lock mechanism has a restraining member that is biased into a lock position, which prevents the moveable weight from moving in the back-and-forth directions when the vibrator is inactive. Other embodiments are also described and claimed.

17 Claims, 5 Drawing Sheets

(56) References Cited

U.S. PATENT DOCUMENTS

2011/0018366 A1    1/2011   Choi
2011/0102162 A1*   5/2011   Gregorio et al. ........... 340/407.2

FOREIGN PATENT DOCUMENTS

EP            2197181 A1    6/2010
WO       WO-2010067173 A1    6/2010

OTHER PUBLICATIONS

Kim, J. H., et al., "Development of the Conical Spring Linear Vibrator (CSLV) for Mobile Phone", Magnetics Conference 2005. INTERMAG Asia 2005. Digests of the IEEE International, Apr. 4-8, 2005, on pp. 211-212, ISBN: 0-7803-9009-1, 1 page.

TW Office Action (dated Jun. 10, 2014), Application No. 101118866, Date Filed—May 25, 2012, (12 pages).

Apple Inc., ROC (Taiwan) Application No. 101118866; Office Action and Search Report received on Oct. 16, 2014.

\* cited by examiner

HAPTIC ALERT DEVICE HAVING A LINEAR VIBRATOR

An embodiment of the invention is related to haptic alert devices used in consumer electronic mobile devices such as smart phones. Other embodiments are also described.

BACKGROUND

Mobile phones have built-in vibrators that produce mechanical vibrations, which are intended to be felt by a user of the mobile phone as an alert or feedback mechanism. The vibrator is part of what is referred to as a haptic alert device or haptic feedback device. In a linear vibrator, a spring-loaded weight is attached to a moving element of a linear electric motor. The motor drives the attached weight back-and-forth, in response to a sinusoidal input drive current. The frequency of the drive current is controlled so that it coincides with a resonant frequency of the spring, weight and motor combination. This enables the driven weight to produce strong vibrations.

SUMMARY

When a user taps or abruptly moves a mobile phone that has a conventional linear vibrator, the moveable weight of the vibrator can move back-and-forth by a significant amount. This may give the user who is holding the phone a strange feeling that something is loose, or it may simply produce an undesired sound.

An embodiment of the invention is a haptic alert device that is to be integrated into a host, portable electronic or mobile device. The haptic alert device includes a vibrator that has a first linear electric motor that is coupled to drive a moveable weight. The moveable weight is to move back-and-forth, while being driven by the first linear electric motor. A second electric motor is provided that is coupled to control the movement of the weight, as part of a lock mechanism that mechanically holds or restrains the weight, when the vibrator is not in use. The second motor is coupled to a restraining member, e.g. a pin or a brake member, that may be biased into a lock position that holds the weight. To release the weight, and thereby enable the vibrator to produce the intended mechanical vibrations, the second motor is energized to disengage the restraining member from the weight.

In another embodiment of the invention, the second electric motor is not needed. In this case, the restraining member may include a pivoting arm that is biased into the locked position, when an electric motor is de-energized. The pivoting arm is provided with a magnetic region, such as at an end of the pivoting arm, that is located near the magnetic field-producing coil of the motor. When the motor is energized to a first level or degree, a sufficient magnetic flux density is generated that interacts with the magnet of the pivoting arm so as to cause the arm to move out of its locked position into a release position. The same motor may then be used to produce the vibrations, by further energizing it to a higher, second level.

Other embodiments of the invention lie in a process of operating a haptic alert device upon receiving a haptic alert command. In one embodiment, in response to receiving the haptic alert command, a first drive current is signaled that energizes a first electric motor so that a moveable weight of the haptic alert device is released. The moveable weight was being held essentially still, while the electric motor was de-energized. Next, a second drive current is signaled to cause a back-and-forth movement of the moveable weight, in order to produce the intended vibrations. In one aspect, these first and second drive currents flow through the same electric motor. In that case, the first drive current may be essentially constant or dc, and the second drive current may be oscillatory or ac but with a dc component that is larger than the first drive current. In another embodiment, the second drive current is through a second, different electric motor.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1A:
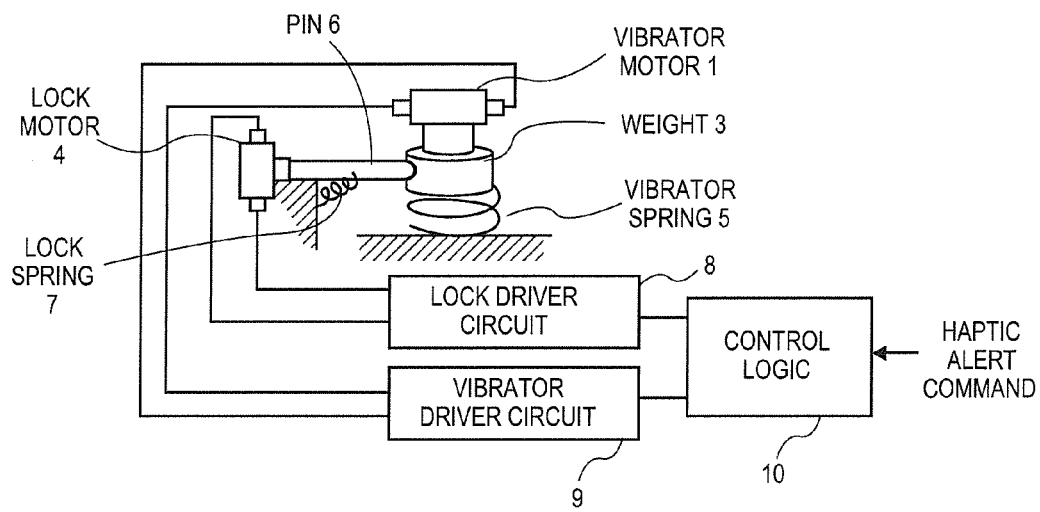
FIG. 1A is a combined schematic and block diagram of a haptic alert device, in accordance with an embodiment of the invention.
Figure 1B:
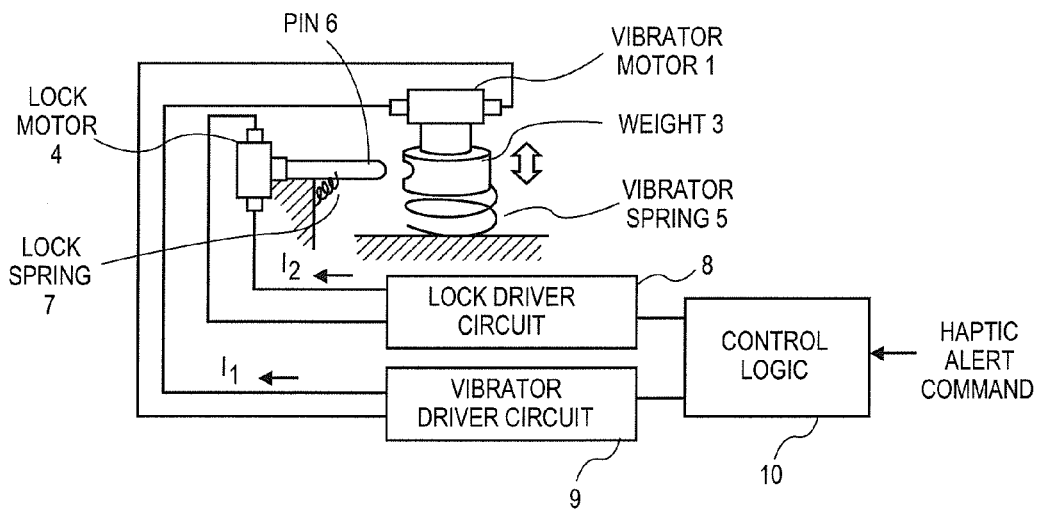
FIG. 1B depicts the haptic alert device of FIG. 1A but with the lock mechanism disengaged.

FIG. 1A and FIG. 1B are combined schematic and block diagrams of a haptic alert device, in accordance with an embodiment of the invention. The haptic alert device has a lock mechanism for a vibrator, which is shown as being engaged in FIG. 1A, and disengaged in FIG. 1B. The haptic alert device may encompass a vibrator having a vibrator motor 1, which in this case is a linear electric motor, e.g. an electro-mechanical solenoid, a voice coil motor, and a piezo-electric motor. The vibrator motor 1 may be fixed in position within a housing (not shown), and its moveable element is coupled to actively drive a moveable weight 3 back-and-forth as shown in FIG. 1B. Note that the term "motor" is used generically in this document in the sense of an electro-mechanical energy converter and may encompass different types of motor technology (which may or may not use a magnet and wire coil combination).

A vibrator spring 5 may be provided that couples the weight 3 to a fixed surface, such as a nearby frame or housing portion as shown. The spring 5 also serves to bias the weight 3, i.e. give it a predetermined position within its range of back-and-forth movement. The spring 5 may enable the vibrator to produce the mechanical vibrations more efficiently, and may also lead to stronger vibrations (especially at resonance). The term "spring" is used generically here to refer to any suitable elastic object that may be able to store some mechanical energy. While the spring 5 is depicted as a mechanical coil in the figures, it should be understood that other elastic structures may be used, such as a tension-type helical structure, a torsion bar, a hydraulic actuator, and a magnetorheological fluid-based combination spring and damping structure.

With respect to the weight 3, this may essentially be a mass that has been selected to enable the haptic alert device to produce the desired haptic sensation (strong mechanical vibrations) for a user who is touching a host device in which the haptic alert device is integrated. It may be that the weight 3 is integrated with the vibrator motor 1; for instance, the weight 3 may actually be part of a moveable magnet system of the vibrator motor 1, and thus need not necessarily be a separate mass that is added to the motor 1. The magnetic field generating portion, such as a voice coil or other wire coil structure, may be fixed in relation to the weight 3. Alternatively, the coil may be attached to move with the weight 3, while the magnet system is fixed. Accordingly, the diagrams depicting the motor 1 being coupled to the weight 3 should be deemed to be representative of various different mechanical scenarios that result in a substantially linearly moving weight producing strong enough vibrations to be used as a haptic alert device, suitable for use in a consumer electronic device such as a smart phone, a cellular phone, a notebook or laptop computer, a pointing or cursor control device such as a mouse or a video game controller, and an input device such as a keyboard.

As seen in FIG. 1A, when the vibrator motor 1 is de-energized such that the weight 3 remains essentially static, a lock mechanism that includes a restraining member, here depicted as a moveable pin 6, is automatically engaged to mechanically hold or restrain the weight from moving back-and-forth. This may be achieved using several different techniques. In the example of FIG. 1A, a lock spring 7 is used that has one end attached to a nearby frame or housing and the other attached to the moveable pin 6. The spring 7 urges the pin 6 forward into contact with the weight 3, at a mating divot or notch that is formed in an external surface of the weight 3. A lock motor 4 is coupled to control movement of the weight 3, by being coupled to the pin 6 so that when the lock motor 4 is energized, the motor 4 acts upon the pin 6 so as to release the weight 3. This is depicted in FIG. 1B, where the lock motor 4 pulls the pin 6 backward and out of the divot, thereby releasing the weight 3. In this state, the vibrator motor 1 can be energized (with drive current $I_1$) to actively drive the weight 3 back-and-forth to produce the desired vibrations. During this time, the lock motor 4 may remain energized, by virtue of a drive current $I_2$, so as to maintain the pin 6 in its retracted position as shown. The lock motor 4 may be for example an electromechanical solenoid, a voice coil motor, or an electrostatic actuator.

An alternative to using the lock spring 7 is a motor mechanism that can inherently bias the pin 6 to hold the weight 3, and that can also move or actuate the pin 6 (or other restraining member) to release the weight 3, in response to an input drive current. An example of such a mechanism is a piezo motor (piezo actuator) that, in a de-energized state, urges the pin 6 forward to hold the weight 3; the piezo motor is then energized to retract the pin 6 thereby release the weight 3. Note that the pin 6 may be integral part of the piezo actuator, i.e., it may be a part of the portion the piezo actuator whose dimensions change in response to an input drive current or electric field being applied. An alternative to the piezo actuator is a bimetallic thermal actuator. Also, the motor used for the locking mechanism may be a MEMS-type motor or actuator.

The electronics for obtaining the respective drive currents $I_1$, $I_2$ are provided by a vibrator driver circuit 9 and a lock driver circuit 8, respectively. The vibrator driver circuit 9 produces an oscillatory or ac drive current $I_1$, in the case where the vibrator motor 1 is a linear motor. As for the lock motor 4, the drive current $I_2$ may be a dc or constant current, e.g. in the case where the lock motor 4 is an electro-mechanical solenoid or a voice coil motor. The higher layer decisions as to the timing of the drive currents $I_1$, $I_2$ may be made by control logic 10, in response to an input haptic alert command. The latter may be produced by, for instance, an applications processor (not shown) that is running in the host device in which the haptic alert device is integrated. For instance, the haptic alert command may be an incoming call alert, generated upon receiving an incoming call signal, that may mimic the typical ringtone that is heard by a caller, in order to alert a user of the host device using vibrations that coincide with the ring sequence. The haptic alert command may alternatively represent another type of alert or feedback to the user, such as an incoming message being received by the host device, or a sudden event during a video game being run in the host device.

Figure 1C:
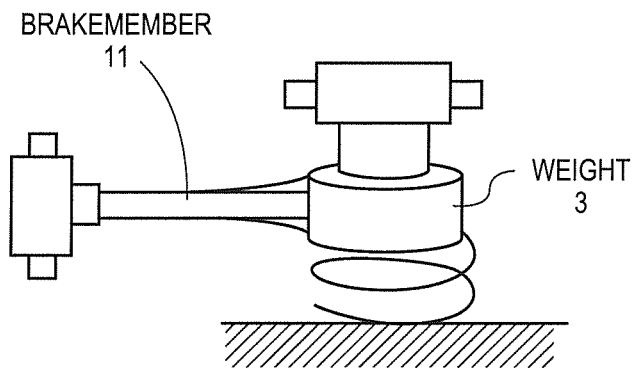
FIG. 1C and FIG. 1D show alternatives to the pin and divot combination depicted in FIG. 1A and FIG. 1B.
Figure 1D:
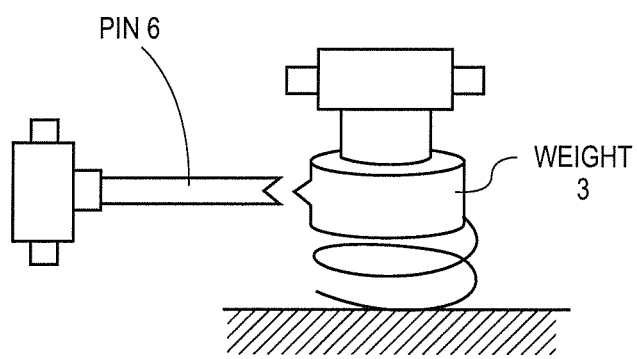

It should be noted that while FIG. 1A and FIG. 1B depict the restraining member as a pin 6 that is inserted within a divot or notch formed within the external side surface of the weight 3, an alternative is a brake member 11 (see FIG. 1C) which simply touches the external side surface of the weight 3 thereby producing sufficient friction to prevent the weight 3 from moving back-and-forth when the user taps or shakes the host device (while the vibrator motor 1 is de-energized). Another alternative is a reverse of the pin and divot combination shown—see FIG. 1D. It should also be noted that while the figures show the pin 6 as actually touching the weight 3 in order to hold the latter, an alternative is that the restraining member (e.g., the pin 6 or the brake member 11) would touch not the actual weight 3 itself, but rather another component that is rigidly fixed to the weight 3, such as a separate permanent magnetic element, a yoke of the magnet system, or a frame or support of a moving element of the vibrator motor 1.

Yet another way for the restraining member to mechanically hold or restrain the weight 3 is to locate the pin 6 so that when the pin 6 is preloaded by the lock spring 7 (see FIG. 1A), the pin 6 acts as a stop against an external end surface of the weight (instead of against a side surface as shown in the figures here). This technique can also prevent movement in the back-and-forth direction (when the vibrator motor 1 is de-energized), but without having to actually touch the external side surface of the weight 3. In that embodiment, the pin 6 could have a fork-shaped end or U-shaped end that is slightly larger than the height of the weight 3 (the height as shown in FIG. 1A is in the vertical direction), so as to capture the weight 3 within the two elements of the fork or U. Since the pin 6 is understood to be fixed in the vertical direction, a fork or U-shaped pin 6 would also result in holding the weight 3 (preventing its movement in the vertical direction). The fork or U-shaped embodiment is beneficial since it may decouple the design requirements of the vibrator spring 5 (which may be selected to provide enhanced vibration strength) from that of the locking mechanism. In a further embodiment, rather than having a fork-shaped or U-shaped end, the pin 6 could simply touch one end, that is either the top end or the bottom end, of the weight 3, thereby preventing the latter from moving in the direction of the pin. In such a case, the vibrator spring 5 should be selected to be sufficiently stiff so as to reduce unwanted movement in the opposite direction, that is, away from the pin.

Figure 2:
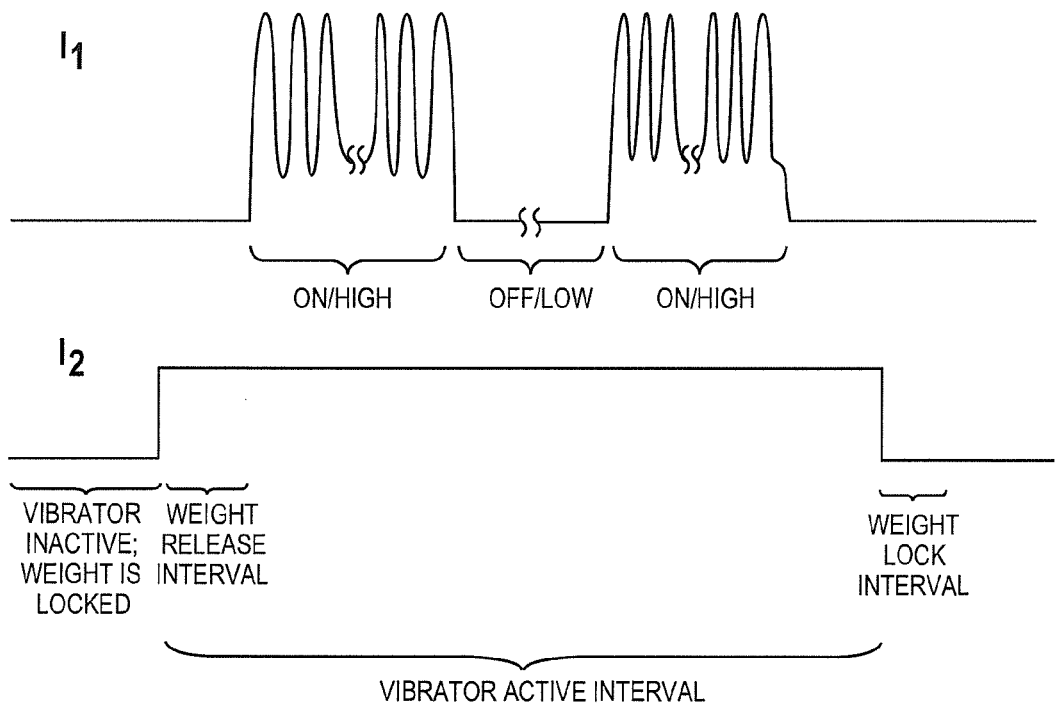
FIG. 2 depicts example drive current waveforms for the two electric motors of the embodiment of FIG. 1A.

Turning now to FIG. 2, example drive current waveforms for the two electric motors of the embodiment of FIG. 1A and FIG. 1B are depicted. The waveform for $I_2$ (the lock motor current) begins in a vibrator inactive phase in which the weight 3 remains locked by virtue of the restraining member (e.g., pin 6) being preloaded into a position that holds the weight 3. When a haptic alert command is then received by the control logic 10, the lock driver circuit 8 is signaled to activate the drive current $I_2$, in this example raising a dc current level from a neutral level (e.g., essentially zero) to a level that is sufficient to energize the lock motor 4 so as overcome the lock spring 7 and thereby release the weight 3. The short interval immediately after the increase in drive current is referred to here as the weight release interval, which is the interval of time needed to actually disengage the restraining member from the weight 3. Once the lock motor 4 has been energized in this manner, thereby causing the release of the weight 3, the vibrator may be deemed to be active. At that point, the control logic 10 then signals the vibrator driver circuit 9 to activate the second drive current (here, $I_1$) thereby energizing the vibrator motor 1, in order to produce the back-and-forth movement of the moveable weight 3. In the example of FIG. 2, a sequence of "on" and "off" intervals is depicted for the vibrator motor drive current $I_1$, where in the "on" intervals the motor current is sinusoidal (as needed by a linear motor that is driving the weight 3). As an alternative to the "on" and "off" pattern shown, the sequence may be that of a "high" drive current and a "low" drive current, where in a high interval the oscillation amplitude of the motor current is significantly larger than in a low interval. As a further alternative, the drive current $I_1$ need not be pulsed in the manner shown, but rather may be continuously on (oscillatory) during the entire vibrator active interval.

The control logic 10 determines the end of the vibrator active interval, and this may be a function of the input haptic alert command. For instance, after an initial "haptic on" command, the control logic 10 could maintain the vibrator active interval until receiving a "haptic off" command. At that point, the control logic 10 will signal the drive current $I_1$ to its neutral current condition, thereby stopping the production of the back-and-forth movement of the weight 3, followed by signaling the drive current $I_2$ to also return to a neutral current level. There may be a short lock interval during which the locking mechanism, in particular, its restraining member (e.g., pin 6) reengages to hold the weight 3.

Figure 3A:
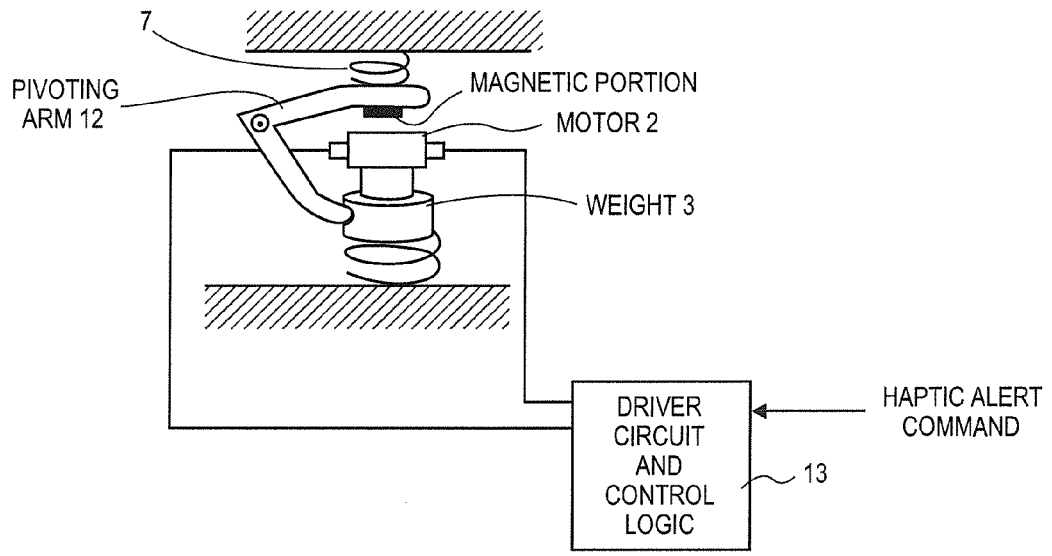
FIG. 3A is a combined circuit schematic and block diagram of a haptic alert device in accordance with another embodiment of the invention.

In the above-described embodiment of FIG. 1A and FIG. 1B, the lock mechanism uses a separate lock motor 4 in order to release the moveable weight 3 (in preparation for the vibrator active phase). This is not needed in the embodiment of FIG. 3A and FIG. 3B, where a single motor 2 serves to both actively drive the moveable weight 3 in back-and-forth directions (in order to produce the needed vibration), as well as disengage the lock mechanism (just prior to the vibrator active phase). The lock mechanism in this embodiment also has a restraining member that is biased into a lock position as shown in FIG. 3A, which prevents the moveable weight 3 from moving in the back-and-forth directions when the vibrator is inactive. In this case, the restraining member has a pivoting arm 12 that is turned into the locked position shown, when the electric motor 2 is de-energized, by the lock spring 7 which may be anchored to a nearby wall of a housing or case. When the motor 2 is de-energized, the pivoting arm 12 is urged into the lock position shown in FIG. 3A by turning around a pivot point as shown.

Note that the alternatives for the pin 6 that were described in connection with the embodiment of FIG. 1A and FIG. 1B are also applicable to the pivoting arm 12 of FIG. 3A and FIG. 3B. For instance, the end of the pivoting arm 12 which actually touches the weight 3 is shown as being similar to the pin 6 of FIG. 1A. Alternatively, however, it may be similar to the brake member 11 which simply generates enough friction against a smooth or flat external side surface of the weight 3 (as opposed to a divot or a bump). The fork alternative is also possible here, as well as a single pin that does not need a divot or notch but rather simply acts as a stop against the top end or bottom end surface of the weight 3 (in either the upward or downward direction).

Figure 3B:
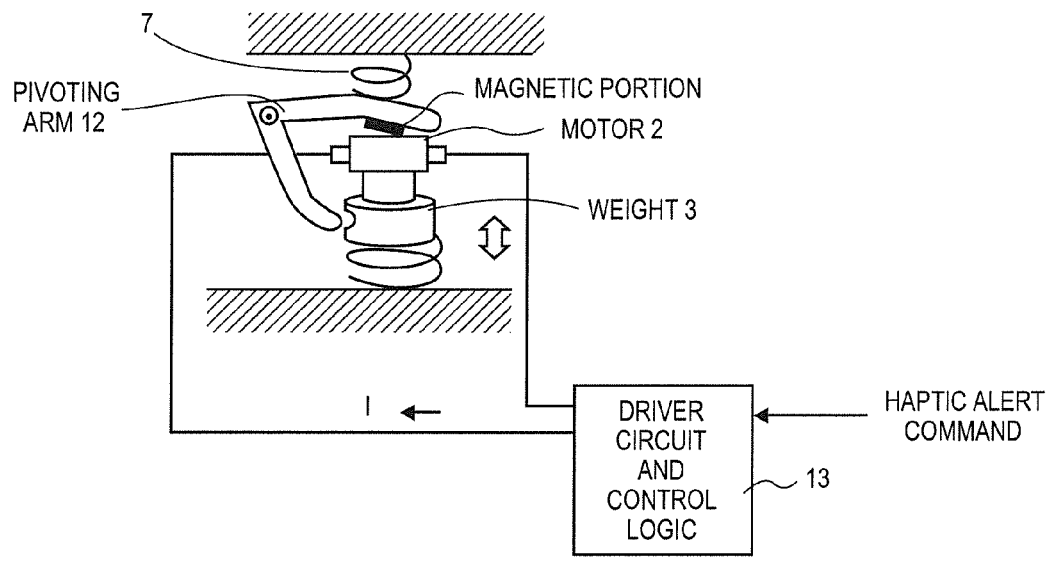
FIG. 3B depicts the haptic alert device of FIG. 3A but with the lock mechanism disengaged.

To enable the use of the single motor 2 as both the vibrator motor and the lock motor, the pivoting arm 12 may have a magnetic portion or region as shown in FIG. 3A and FIG. 3B, that is positioned to interact with the magnetic field generated by the motor 2 when the latter is energized, thereby causing the pivoting arm 12 to rotate out of its lock position—see FIG. 3B. In that state, the weight 3 is free to move back-and-forth and can be actively driven by the motor 2.

The drive current needed for operating the motor 2 in the embodiment of FIG. 3A and FIG. 3B is produced by driver circuit and control logic 13, responsive to an input haptic alert command. The driver circuit and control logic 13 contains the needed analog and digital circuitry to detect a haptic alert command and respond to it by producing a drive current I through the motor 2. An example waveform for this drive current is shown in FIG. 4.

Figure 4:
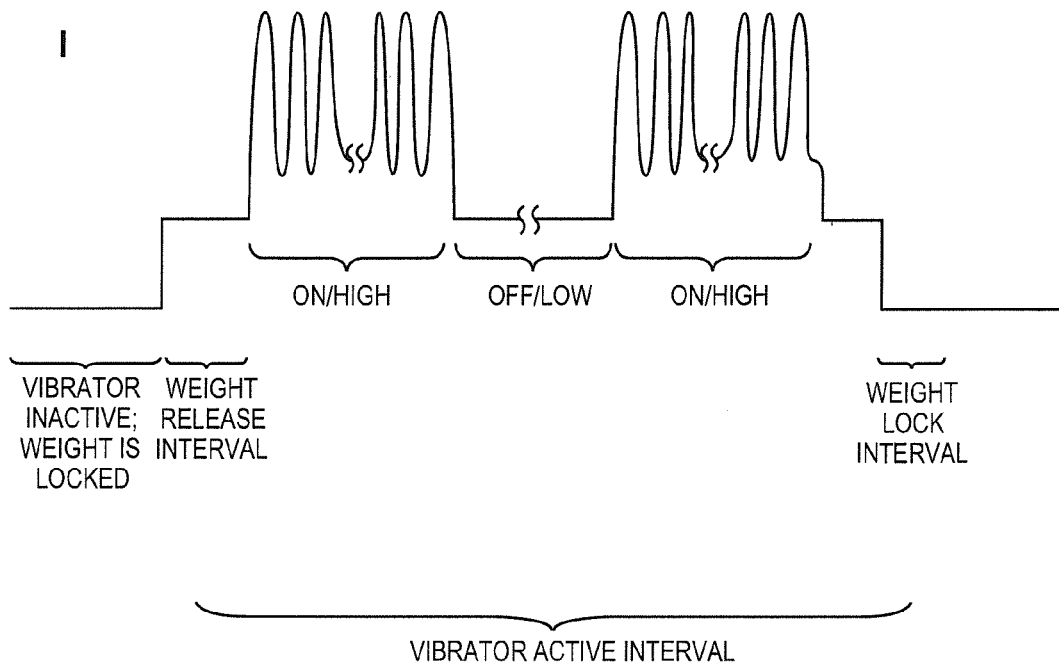
FIG. 4 is an example drive current waveform for the motor of the embodiment of FIG. 3A.

Referring now to FIG. 4, the example drive current I also has three phases in this case (similar to the drive currents $I_1$ and $I_2$ of FIG. 2), namely a vibrator inactive phase in which the motor 2 is de-energized (and the weight 3 is locked), a weight release phase or interval in which the motor 2 is energized and the restraining member (in this example the pivoting arm 12) is driven out of the lock position thereby freeing the weight 3 for back-and-forth movement, and a vibrator active phase or interval in which the motor 2 is further energized in an oscillatory or ac manner so that the weight 3 is actively driven back-and-forth while the pivoting arm 12 remains out of the lock position.

Now, referring to the various phases of the drive current I depicted in FIG. 4, a process for operating the haptic alert device may begin by responding to the input haptic alert command by activating a first drive current in the weight release interval. This is depicted by the jump in motor current as shown, from a neutral (e.g., essentially zero) level to a constant dc level that is sufficient to generate enough force through interaction with the magnetic portion of the pivoting arm 12 so as to overcome the lock spring 7, thereby moving the pivoting arm 12 out of its lock position.

Next, a second drive current is activated to produce the back-and-forth movement of the moveable weight 3. This is represented by the one or more ON/HIGH intervals in the depicted motor current waveform, which are oscillatory or ac but that have a dc component that is sufficiently greater than that of the first drive current to ensure that the lock mechanism remains disengaged during the entire vibrator active interval. At the end of the vibrator active interval, the driver circuit and control logic 13 will deactivate the second drive current, to stop producing the back-and-forth movement of the moveable weight 3. This may essentially result in the motor current being returned to the initial dc current level as shown (which may be the level that was used to initially disengage the lock mechanism). Next, the drive current is lowered even further, for example down to essentially zero or some other neutral level, to allow the lock mechanism to reengage and thereby hold the moveable weight in essentially a fixed position. This ends the vibrator active interval.

In the above discussion, it should be noted that while the moveable weight 3 may be held in essentially a fixed position (in the vertical direction) when the lock mechanism has been engaged, it should be understood that the weight 3 need not actually be held absolutely still. Rather, the weight should be kept still enough so as not to produce any noticeable feeling of movement or looseness or sound, that can be felt or heard by the user of a host portable electronic device in which the haptic alert device has been integrated. For instance, a test may be to ask a user of the host device to tap or shake the device according to normal usage scenarios, while the haptic alert device is inactive, and then indicate whether the user can feel or hear movement of the weight 3.

Figure 5:
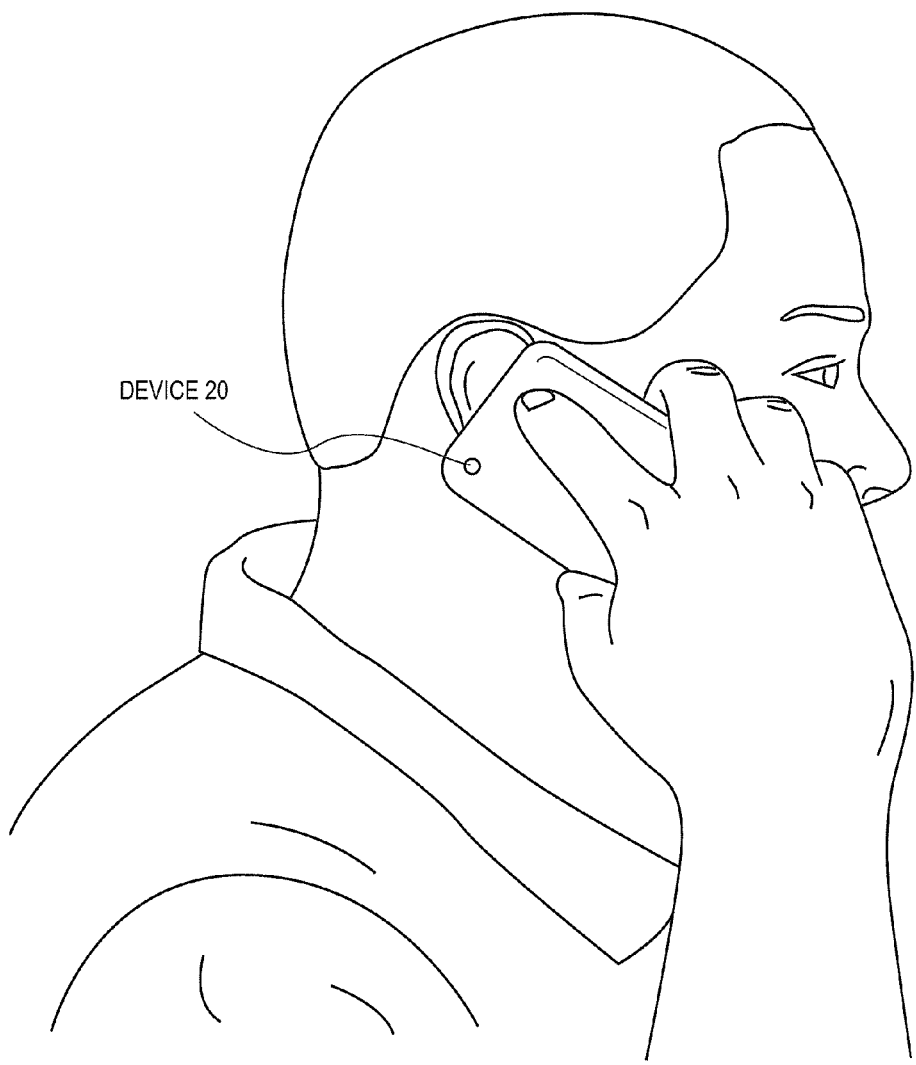
FIG. 5 depicts a mobile device in use, namely a smart phone or cellular phone, and in which the haptic alert device may be integrated.

As indicated above, the haptic alert device may be integrated into a consumer electronic device 20. FIG. 5 depicts an example of such a device, being in this case a mobile phone shown here during handset use against the user's ear (while a telephone call is being conducted). The electronic device 20 has a mobile phone housing as shown in which are integrated several relevant conventional components. These may include a user interface display screen, a user interface keypad or keyboard (physical or virtual), a wireless communications interface circuit, a data storage having stored therein a telephony application program, and a processor to execute the application program. In response to receiving an incoming call signal from the communications interface circuit, the processor, while executing the telephony application program, may send a haptic alert command to a haptic alert device that is also integrated within the mobile phone housing. As described above, the haptic alert device includes a driver circuit and control logic that responds to the haptic alert command by providing the needed motor drive current at an input of one or more electric motors that constitute a vibrator. The processor may be an applications processor, a central processing unit, or a dedicated subsystem processor such as a communications baseband processor. The latter is often used to perform channel coding and decoding for digital communications protocols such as 3G and 4G cellular wireless protocols. The wireless communications interface circuit may alternatively be in accordance with a wireless local area network specification, e.g. IEEE 802.11. The wireless communications interface circuit would include not just the digital signal processing elements but the radio frequency (RF) portion that transmits and receives over the air RF radiation using an antenna. As to the data storage, this may be any suitable non-volatile solid state memory, a kinetic mass storage device such as a hard disk drive, and a combination with volatile storage devices such as dynamic random access memory.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the consumer electronic device is depicted as a mobile phone in FIG. 5, other such electronic devices are contemplated, e.g. a multimedia entertainment system and its associated peripherals such as remote control units, mouse units, keyboards, and handheld video game controllers. The description is thus to be regarded as illustrative instead of limiting.

What is claimed is:

1. An apparatus for use as part of a haptic alert device, comprising:
    a vibrator designed to be integrated into a portable electronic device as part of a haptic alert device, the vibrator having a first linear electric motor coupled to actively drive a movable weight back-and-forth;
    a second electric motor coupled to control movement of the movable weight;
    a restraining member to mechanically hold or restrain the weight from moving back-and-forth when the haptic device is not in use,
    wherein the second motor is coupled to the restraining member so that the second motor when energized acts upon the restraining member to release the weight when the haptic device is in use;
    a driver circuit to provide separate drive currents at respective input contacts of the first and second motors; and
    control logic having an input to receive a haptic alert command signal, the control logic being coupled to the driver circuit to control the timing of the drive currents so that the second motor is energized before the first motor, in response to receiving the haptic alert command signal.

2. The apparatus of claim 1 further comprising a first spring coupled to the weight.

3. The apparatus of claim 2 further comprising a second spring coupled to the restraining member.

4. The apparatus of claim 3 wherein the restraining member comprises one of the group consisting of a pin, a brake member, and a fork, that is biased into a lock position by action of the second spring when the second motor is de-energized.

5. The apparatus of claim 1 wherein the second motor is one of an electromechanical solenoid, a voice coil motor, a piezo actuator, a bimetallic thermal actuator, and an electrostatic actuator.

6. An apparatus for use as part of a haptic alert device, comprising:
    a vibrator designed to be integrated into a portable electronic device as part of a haptic alert device, the vibrator having a linear electric motor coupled to actively drive a movable weight in back-and-forth directions; and
    a lock mechanism having a restraining member that is biased into a lock position which prevents the movable weight from moving in the back-and-forth directions when the electric motor is de-energized; and
    a driver circuit and control logic to provide a drive current at an input of the linear electric motor, which is responsive to a haptic alert command;
    wherein the driver circuit and control logic provide the drive current with at least three different phases namely a vibrator inactive phase in which the electric motor is de-energized, a weight release phase in which the electric motor is energized so that the restraining member is driven out of the lock position, and a vibrator active phase in which the electric motor is energized so that the weight is actively driven back-and-forth while the restraining member remains out of the lock position.

7. The apparatus of claim 6 wherein the restraining member comprises a pivoting arm that is biased into the lock position when the linear electric motor is de-energized.

8. The apparatus of claim 7 wherein the pivoting arm comprises a magnetic region positioned to interact with a magnetic field generated when the linear electric motor is energized, so as to cause the arm to move out of its lock position.

9. The apparatus of claim 7 wherein the vibrator comprises a first spring coupled to the weight, and the lock mechanism comprises a second spring coupled to pre-load the pivoting arm.

10. A method for operating a haptic alert device, comprising:
   receiving a haptic alert command and in response to receiving the haptic alert command, performing
      a) activating a first drive current, wherein the first drive current energizes a first electric motor so as to release a restraining member that mechanically holds or restrains a moveable weight of a haptic alert device from moving back-and-forth when the haptic device is not in use; and then
      b) activating a second drive current of a second electric motor that produces back-and-forth movement of the moveable weight, wherein activating the first and second drive currents includes providing separate drive currents at respective input contacts of the first and second motors.

11. The method of claim 10 wherein the first and second drive currents are through the electric motor.

12. The method of claim 11 wherein the first drive current is essentially dc and the second drive current is ac.

13. The method of claim 12 wherein second drive current has a dc component that is larger than the first drive current.

14. The method of claim 10 wherein the second drive current is through a further electric motor.

15. The method of claim 10 further comprising:
   deactivating the second drive current to stop producing the back-and-forth movement of the moveable weight; and then
   deactivating the first drive current to hold the moveable weight in essentially a fixed position.

16. A portable electronic device comprising:
   a mobile phone housing having integrated therein
      a wireless communications interface circuit;
      a haptic alert device having (1) a linear electric motor coupled to actively drive a movable weight back-and-forth, (2) a lock mechanism having a restraining member that is biased into a lock position that holds the moveable weight in essentially a fixed position when the haptic alert device is inactive, and (3) a driver circuit and control logic to provide a drive current, at an input of the linear electric motor, which is responsive to the haptic alert command, wherein the driver circuit and control logic provide the drive current with at least three different phases namely an inactive phase in which the electric motor is de-energized, a weight release phase in which the electric motor is energized so that the restraining member is driven out of the lock position, and an active phase in which the electric motor is energized so that the weight is actively driven back-and-forth while the restraining member remains out of the lock position;
      data storage having stored therein a telephony application program; and
      a processor to execute the telephony application program and, in response to receiving an incoming call signal from the communications interface circuit, send a haptic alert command to activate the haptic alert device.

17. The portable electronic device of claim 16 wherein the haptic alert device comprises:
   a further electric motor coupled to the restraining member and electrically coupled to the driver circuit and control logic, the further motor when energized acts upon the restraining member to move the restraining member out of the lock position to release the weight.

\* \* \* \* \*